(12) United States Patent
Nugroho et al.

(10) Patent No.: US 6,321,323 B1
(45) Date of Patent: Nov. 20, 2001

(54) SYSTEM AND METHOD FOR EXECUTING PLATFORM-INDEPENDENT CODE ON A CO-PROCESSOR

(75) Inventors: Sofyan I. Nugroho, Sunnyvale; Anil K. Srivastava; Rohit Valia, both of Redwood City, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/884,186

(22) Filed: Jun. 27, 1997

(51) Int. Cl.$^7$ ...................................................... G06F 15/82
(52) U.S. Cl. ................................................. 712/34; 711/103
(58) Field of Search ................................ 709/1, 100–108, 709/400; 710/14, 22; 712/1, 28, 30, 31, 34, 25, 26, 27; 717/4, 5; 711/5, 103; 713/1, 2, 100

(56) References Cited

U.S. PATENT DOCUMENTS

| | | | |
|---|---|---|---|
| 5,313,586 | * 5/1994 | Rutman | 712/34 |
| 5,655,131 | * 8/1997 | Davies | 712/34 |
| 5,784,553 | * 7/1998 | Kolawa et al. | 714/38 |
| 5,875,336 | * 2/1999 | Dickol et al. | 717/5 |
| 5,920,720 | * 7/1999 | Toutonghi et al. | 717/5 |
| 5,923,878 | * 7/1999 | Marsland | 717/4 |
| 5,937,193 | * 8/1999 | Evoy | 717/5 |
| 6,126,328 | * 10/2000 | Mallory et al. | 717/4 |

OTHER PUBLICATIONS

"Not Just Java", by Peter van der Linden, SunSoft Press 1997, pp. 92–271.

"Just Java", by Peter van der Linden, SunSoft Press 1997, pp. 340–350.

"The JIT Compiler API", by Frank Yellin, Oct. 4, 1996, pp. 1–23.

"Inside Windows NT", by Helen Custer, Microsoft Press, 1992, pp. 15–30.

"The Java Virtual Machine Specification", by Tim Lindholm etal., Sep. 1996, pp. 57–82.

"Rockwell Unveils a New Chip Created for Java Applications", by Frederick Rose, The Wall Street Journal Interactive Edition, Sep. 22, 1997, 2 pages, http://www.wsj.com/edition/current/articles/SB874891257730788000.html.

"Remote Queues: Exposing Message Queues for Optimization and Atomicity" by Eric A. Brewer et al. 1995.*

* cited by examiner

Primary Examiner—St. John Courtenay, III
(74) Attorney, Agent, or Firm—Park, Vaughan & Fleming LLP (57) ABSTRACT

A system and method for executing platform-independent code on a co-processor is described. The system includes a processor, a main memory and the co-processor, each interconnected with each other. The processor and the co-processor operate under control of an operating system. A memory manager operatively coupled to the operating system initializes a runtime environment including an address space in the main memory for the platform-independent code. A runtime shim operatively coupled to the operating system provides the initialized runtime environment to the co-processor through the operating system. The co-processor executes the platform-independent code responsive to the runtime shim with reference to the address space in the main memory.

32 Claims, 9 Drawing Sheets

SYSTEM AND METHOD FOR EXECUTING PLATFORM-INDEPENDENT CODE ON A CO-PROCESSOR

FIELD OF THE INVENTION

The present invention relates in general to platform-independent code and, in particular, to a system and method for executing platform-independent code on a co-processor.

BACKGROUND OF THE INVENTION

Software developers often strive to tailor or "port" their applications to a variety of computing platforms to achieve a wider user base and increased product acceptance. However, system-dependent variables, such as microprocessor type and operating system, make porting a difficult task. Moreover, ported applications must thereafter be supported in each computing platform-specific environment. Consequently, the overall product cost, including porting and support, must be weighed against the potential gains in the marketplace.

An increasingly preferred alternative to porting customized applications is to write software in a platform-independent programming language, such as the Java™ programming language (hereinafter "Java"). Java™ is a trademark of Sun Microsystems, Inc., Mountain View, Calif. Writing in Java enables developers to create programs for diverse computing platforms independent of the particular microprocessors or operating systems used. Applications written in Java (hereinafter "Java programs") can be utilized over a wide spectrum of computers, both as applications embedded within web pages, called "applets," and as applications which run stand-alone or over a distributed environment.

The Java program code is first "compiled" into platform-independent bytecode. During runtime, the bytecode is "executed." Presently, two forms of interpreters for executing bytecode are used. The first form of interpreter is a software interpreter for executing bytecode on a line-by-line basis, such as the Java virtual machine (JVM) described in T. Lindholm & F. Yellin, "The Java Virtual Machine Specification," Addison-Wesley (1997), the disclosure of which is incorporated herein by reference. The JVM is an application program functionally interposed as a layer between the Java program and the native operating system and hardware. However, the JVM results in a significant performance degradation, potentially causing a slow-down of up to fifty times that of a comparable C or C++ programming language application.

The other form of bytecode interpreter is a native instruction translator, such as the Just-In-Time (JIT) compiler described in F. Yellin, "The JIT Compiler API," ftp://ftpjavasoft.com/docs/jit_interface.pdf, Oct. 4, 1996, the disclosure of which is incorporated herein by reference. The JIT compiler translates the bytecode into native machine instructions to achieve near native code execution speeds. However, a one time computation cost is incurred each time an application is run, thereby causing overall slower execution than applications compiled directly into native machine instructions.

Therefore, there is a need for a system and method for accelerating execution of platform-independent code which avoids the slower performance of a JVM and JIT compiler. Preferably, such a system and method would operate concurrently and independently of the main processor using a co-processor.

SUMMARY OF THE INVENTION

The present invention enables the above problems to be substantially overcome by providing a system and method for executing platform-independent code using a co-processor. Platform-independent code is intercepted at an application layer, an interrupt for a co-processor is generated and the platform-independent program code is executed by the co-processor.

An embodiment of the present invention is a system and method for executing platform-independent code on a co-processor. The system includes a processor, a main memory and the co-processor, each interconnected with each other. The processor and the co-processor operate under control of an operating system. A memory manager operatively coupled to the operating system initializes a runtime environment including an address space in the main memory for the platform-independent code. A runtime shim operatively coupled to the operating system provides the initialized runtime environment to the co-processor through the operating system. The co-processor executes the platform-independent code responsive to the runtime shim with reference to the address space in the main memory.

A further embodiment of the present invention is an apparatus for efficiently executing platform-independent code in a computer system. The computer system includes a processor and a main memory with each interconnected with each other. Interfacing logic interconnects the apparatus with the processor and the main memory and includes channels for exchanging control, data and address signals with the processor and the main memory. A co-processor executes the platform-independent code in coordination with but independently from the processor. A buffer is interconnected with the co-processor and includes a plurality of storage locations in which are staged segments of the platform-independent code prior to execution by the co-processor. A direct memory access (DMA) controller is interconnected with the buffer and interfaces directly to the main memory through the interfacing logic. The DMA controller stages the segments of the platform-independent code into the buffer from the main memory. A bus internal to the apparatus interconnects the interfacing logic, the co-processor, the direct memory access controller, the programmable read only memory and the read only memory. The interfacing logic provides the control, data and address signals over the internal bus.

A further embodiment of the present invention is a method using a computer for facilitating execution of platform-independent program code on a co-processor. The computer includes a processor, a main memory and the co-processor with each interconnected with each other. A runtime environment including an address space in the main memory in which is stored the platform-independent program code is initialized. The co-processor is notified to begin execution of the platform-independent program code including being provided the address space in the runtime environment to the co-processor. Execution of the platform-independent program code by the co-processor with independent execution of other program code by the processor is coordinated and the main memory between the address space in the runtime environment and the main memory used by the processor is managed.

Still other embodiments of the present invention will become readily apparent to those skilled in the art from the following detailed description, wherein is shown and described only the embodiments of the invention by way of illustration of the best modes contemplated for carrying out the invention. As will be realized, the invention is capable of other and different embodiments and several of its details are capable of modification in various obvious respects, all without departing from the spirit and scope of the present invention. Accordingly, the drawings and detailed description are to be regarded as illustrative in nature and not as restrictive.

DETAILED DESCRIPTION

I. System for Accelerating Execution of Platform-Independent Program Code

Figure 1:
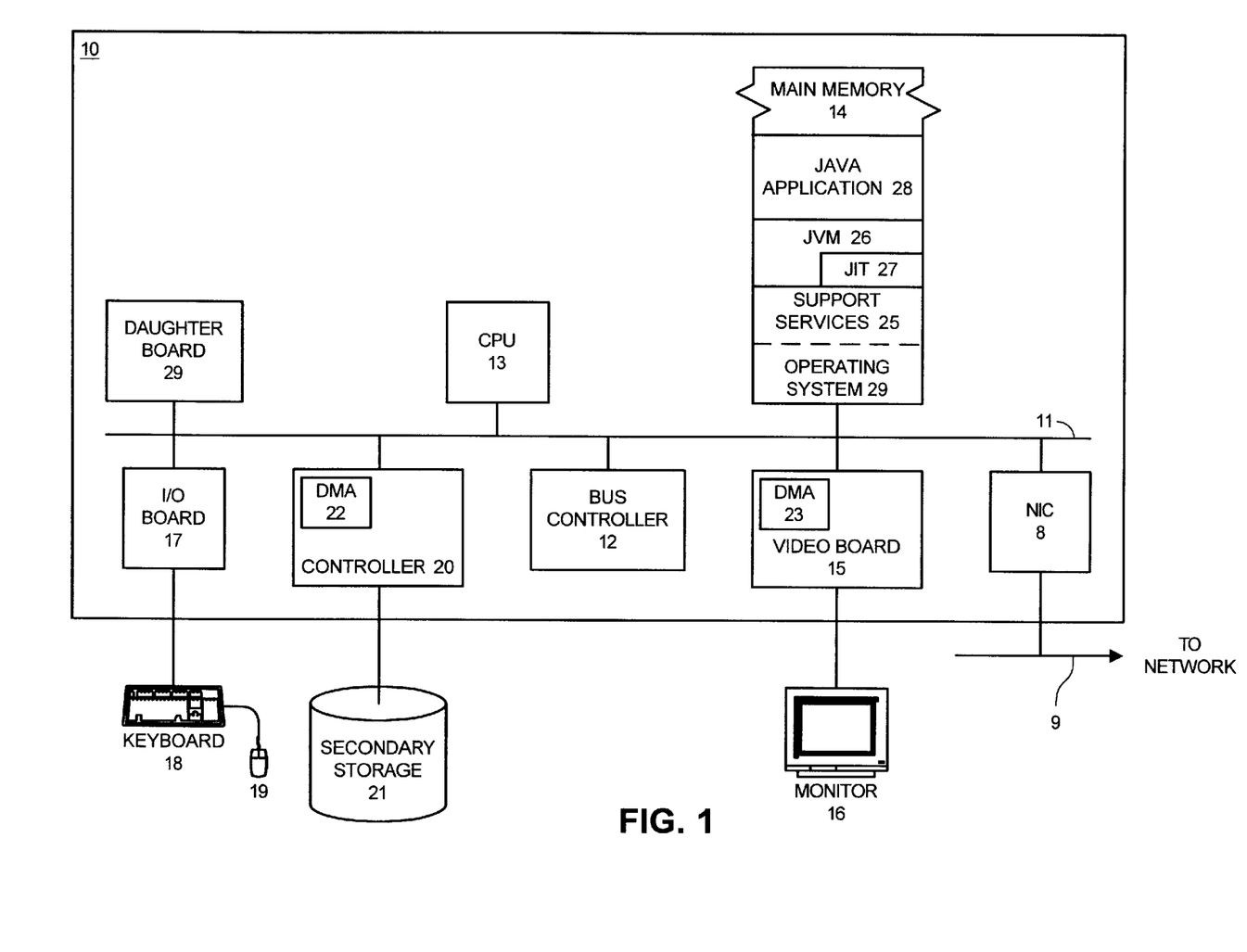
FIG. 1 is a schematic diagram of a system for accelerating execution of platform-independent program code on a co-processor according to the present invention.

FIG. 1 is a schematic diagram of a system 10 for accelerating execution of platform-independent program code, such as bytecodes 51 for a Java application 28 (described below), on a co-processor 34 (shown in FIG. 2 and included as part of a daughter board 29 shown in FIG. 1) according to the present invention. The system 10, with the exception of the daughter board 29, is a conventional programmed digital computer. The individual components implementing the system 10 are interconnected with a central system bus 11 used for exchanging addresses, data and control signals. Other forms of component interconnections are possible. Access requests to the system bus 11 are coordinated by a bus controller 12. A central processing unit (CPU) 13 interconnected with the system bus 11 controls the execution of the system 10. A main memory 14 also interconnected with the system bus 11 stores data and instructions for execution by the CPU 13.

A plurality of peripheral components can be interconnected via system bus 11, including a network interface controller (NIC) 8 for interconnecting the system 10 with a network 9 for exchanging data and control signals transmitted as a data signal in a carrier wave; a video board 15 for displaying program output via a monitor 16; an input/output (I/O) board 17 for providing user input devices, such as a keyboard 18 and mouse 19; and a controller 20 connected to a secondary storage device 21, such as a hard disk or tape drive unit. The system 10 can also include devices for accepting computer-readable storage medium (not shown). Finally, expansion cards can be plugged into the system bus 11 for providing additional functionality to the system 10, such as a daughter board 29 with a co-processor for executing bytecode at substantially near native instruction execution speed. The daughter board 29 is further described hereinbelow with reference to FIG. 2.

Upon boot-up of the system 10, the operating system 24 and support services 25, such as device drivers and related interfaces, are loaded into main memory 14. The main memory area occupied by the operating system 24 and support services 25 is generally referred to as kernel space. Thereafter, the system 10 under the control of the CPU 13 runs application programs, such as a Java virtual machine (JVM) 26, Just-In-Time (JIT) compiler 27 and Java application 28. The main memory area occupied by the application programs is generally referred to as user space. The program code for each application program is first retrieved from the secondary storage 21 and stored into main memory 14 for execution by the CPU 13.

In the described embodiment, the system 10 is an IBM-PC compatible microcomputer running the Windows NT operating system environment. However, use of the methods described and suggested herein are not limited to a particular computer configuration. The system bus 11 is a peripheral connection interface (PCI) bus, although other types of system buses, such as industry standard architecture (ISA), NuBus and other buses, can be used. The system bus 11 is a 32-bit bus operating at a speed determined by the system board. The bus controller 12 is a standard bus interface, such as an Intel bus controller for a PCI bus. Finally, the CPU 13 is an Intel i86 or compatible microprocessor, such as a Pentium microprocessor. Windows 95, Intel and Pentium are trademarks or registered trademarks of their respective owners.

Figure 2:
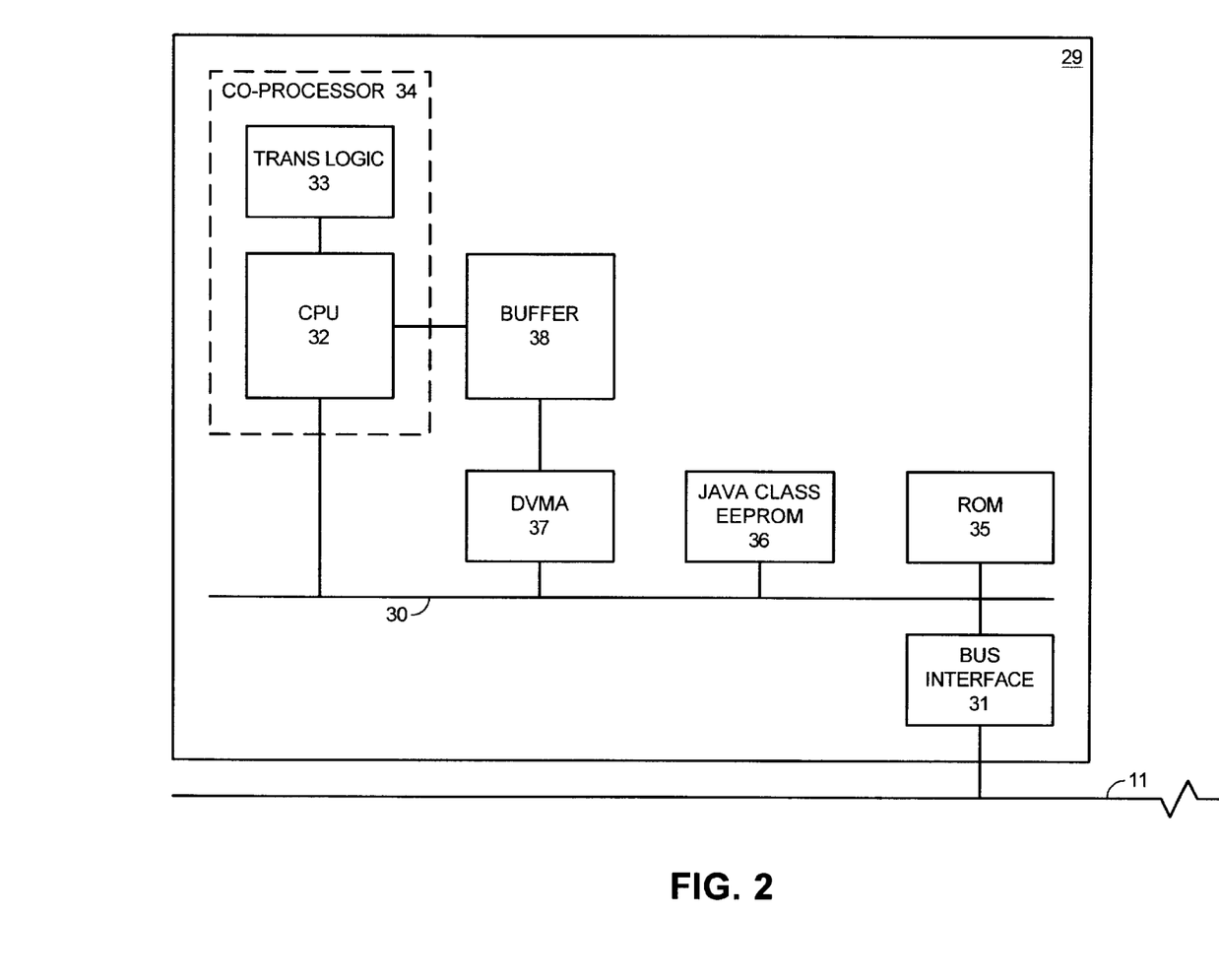
FIG. 2 is a schematic diagram of a daughter board including the co-processor for use in the system of FIG. 1.

FIG. 2 is a schematic diagram of the daughter board 29, including a co-processor 34, for use in the system of FIG. 1. The daughter board is removably interconnected with the system bus 30 via an expansion slot (not shown). The individual components on the daughter board 29 are internally interconnected with a bus 30. Bus interface logic 31 interfaces the bus 30 of the daughter board 29 and the system bus 11 by providing channels for exchanging control, data and address signals with the CPU 13 and the main memory 14. The bus interface logic 31 is a standard component for interfacing an expansion card to the system bus 11, such as the SIS85C50X PCI chipset, manufactured by Intel Corporation, Santa Clara, Calif.

The co-processor 34 is interconnected with the bus 30 for executing the Java application 28 in coordination with but independently from the CPU 13, as further described hereinbelow with reference to FIG. 3 et seq. In one embodiment of the present invention, the co-processor 34 is a microprocessor for directly executing Java programs using bytecodes as its native instruction set, such as the picoJava microprocessor manufactured and licensed by Sun Microsystems, Inc., Mountain View, Calif. The picoJava microprocessor is described in P. van der Linden, "Not Just Java," p. 271, Sun Microsystems Press (1997), the disclosure of which is incorporated herein by reference. In a further embodiment of the present invention, the co-processor 34 is a non-native Java microprocessor 32, such as an Intel i86 microprocessor or compatible or MicroSPARC™ microprocessor, coupled to translation logic 33 for translating Java bytecodes into the instruction set specific to the CPU 32. MicroSPARC™ is a trademark of Sun Microsystems, Inc., Mountain View, Calif. The two embodiments of microprocessor logic will be referred to hereinafter generally as co-processor 34 and include both native and non-native Java bytecode instruction set microprocessors.

Several additional components make up the daughter board 29. First, direct virtual memory access (DVMA) logic 37 is interconnected with a buffer 38 and the bus 30 for directly accessing the main memory 14 via the system bus 11. DVMA logic 37 could also be conventional direct memory access (DMA) logic. In turn, the buffer 38 is interconnected with the co-processor 34 and is used for caching segments of the Java application 28 prior to execution. The buffer 38 includes a plurality of storage locations (not shown) in which are staged by the DVMA logic 37 segments of the Java application 28. In addition to staging program segments, the DVMA logic 37 frees the CPU 13 (shown in FIG. 1) from performing memory accesses for the co-processor 34 and enables the co-processor 34 to avoid memory contention with the CPU 13 while allocating and locking the main memory 14 via the operating system 24. In the described embodiment, the buffer 38 includes a level two cache and a cache controller that is conventional in the art. In a further embodiment of the present invention, the DVMA logic 37 could be replaced by conventional DMA logic for providing direct memory access.

Also, a Java class electronically-erasable, programmable read only memory (EEPROM) 36 is interconnected with the bus 30 for storing Java core classes for use by the co-processor 34. The EEPROM 36 includes a plurality of storage locations (not shown) in which are stored executable core program segments for Java core classes. These core Java classes include those classes specified in the core application programming interface (API) which must be supported by every Java system, such as described in P. van der Linden, "Just Java," pp. 340–350, 2d ed., Sun Microsystems Press (1997), the disclosure of which is incorporated herein by reference. The Java class EEPROM 36 stores bytecodes or pre-compiled native object code for Java core classes, depending upon whether a native or non-native Java co-processor 34 is used.

Using the EEPROM 36 has several benefits. First, the Java core classes are staged in the EEPROM 36, thereby avoiding the need to fetch each core class member from the main memory 14 or secondary storage 21. Thus, core class accesses are faster. Second, the EEPROM 36 allows upgrading of the Java core classes via a download of new firmware codes. Finally, the EEPROM 36 creates a more secure computing environment by preventing spoofing of the core classes. The Java core classes are limited to those classes stored on the Java class EEPROM 36 and thus are immune from unauthorized replacement. In the described embodiment, the Java class EEPROM 36 is a two- or four-megabyte memory device.

Finally, a read-only memory (ROM) 35 is interconnected with the bus 30 for specifying the behavior of the co-processor 34 via microcode instructions. The ROM 35 includes a plurality of storage locations (not shown) in which are stored the microcode instructions. In the described embodiment, the behavior is based on a hardware implementation of the JVM 26 and the ROM 35 is a one-megabyte memory device.

II. System Operational Components

Figure 3:
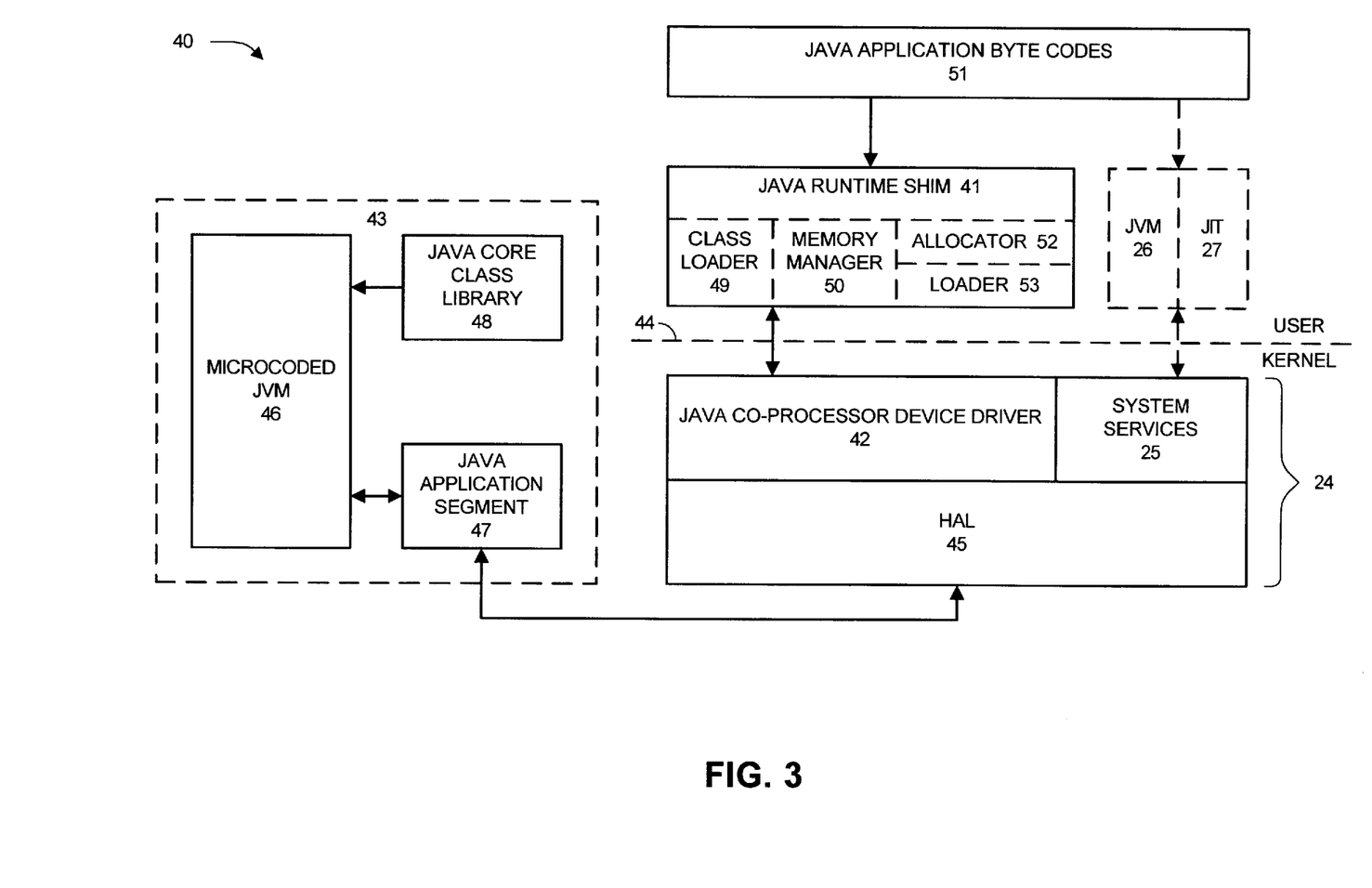
FIG. 3 is a functional block diagram of the operational components used by the system of FIG. 1.

FIG. 3 is a functional block diagram of the operational components 40 used by the system of FIG. 1. Each operational component 40 represents a sequence of process steps embodied preferably in software or firmware which lead to a desired result presented largely in functional terms of methods and symbolic representations of operations on data bits within a programmed digital computer and similar devices. The arrows interconnecting each operational component 40 generally indicate a flow of data or control information between the respective operational components 40. As would be clear to one skilled in the art, the process steps can be embodied as code for a computer program for operation on a conventional programmed digital computer, such as system 10 (shown in FIG. 1). The program code can be embodied as a computer program on a computer-readable storage medium or as a data signal in a carrier wave transmitted over network 9.

Briefly, the Java application 28 (shown in FIG. 1) is made up of bytecodes 51, preferably for Java, but could also be any form of executable, platform-independent program code. Conventionally, the bytecodes 51 are interpreted by the JVM 26 or JIT 27 interfacing the operating system 24 using the CPU 13 directly (shown in FIG. 1). An embodiment of the present invention replaces the JVM 26 and JIT 27 with a Java runtime shim. ("shim") 41 which enables the bytecodes to be interpreted by the co-processor modules 43 using the co-processor 34 (shown in FIG. 2). The individual operational components 40 will now be described, starting with the memory space used by the CPU 13 (shown in FIG. 1).

The memory space of main memory 14 is functionally divided into two types of space: user space and kernel space. The separation of user space and kernel space is indicated by dotted line 44. Other functional divisions of the memory space are possible. The bytecodes 51 for the Java application 28, the JVM 26, the JIT 27 and a Java runtime shim 41 reside in the user space. The operating system 24, including a Java co-processor device driver 42 (described below), the system services 25 and a hardware abstraction layer 45, reside in the kernel space.

Within the operating system 24, the hardware abstraction layer 45 provides an optional interface layer between the individual device drivers, such as the Java co-processor device driver 42, and the physical hardware components of the system 10 (shown in FIG. 1). In the described embodiment, the HAL 45 is part of the Windows NT operating system environment, such as described in H. Custer, "Inside Windows NT," Microsoft Press (1992), the disclosure of which is incorporated herein by reference. In an alternate embodiment, the HAL 45 is replaced by a device driver architecture, such as used in the Windows 95 operating system environment. Windows NT and Windows 95 are trademarks of their respective holders. The present discussion assumes the functionally of the HAL 45 is transparent to the Java co-processor device driver 42.

As conventional in the art, each Java application 28 is initially implemented as Java source code (not shown) which is compiled into bytecodes 51 using a compiler (not shown). Bytecodes 51 are a form of platform-independent program code for operation on a plurality of microprocessors in an architectural neutral fashion. Unlike conventional object code which is generated for a particular processor, bytecodes 51 are executed at a level slightly higher than object code. However, bytecodes 51 can be executed without further compilation or modification conventionally using either the JVM 26 or JIT compiler 27. Moreover, bytecodes 51 are not limited to Java applications 28 and can include applications written in other programming languages compilable into valid bytecodes 51, such as described in P. van der Linden, "Not Just Java," p. 92, Sun Microsystems Press (1997), the disclosure of which is incorporated herein by reference. Upon invocation of a Java program, the CPU 13 loads the JVM 26 or JIT 27 into the main memory 14 (shown in FIG. 1) for execution.

Currently, the JVM 26 is an interpreter executed at runtime for operating on the bytecodes 51 in a line-by-line manner. The JVM 26 implements a simple stack machine (not shown) for translating the bytecodes 51 into the native instruction set of the CPU 13. Since the JVM 26 is itself an application program, the JVM 26 operates in user space as a non-privileged process and does not receive the higher execution priority given to an operating system 24 routine executing in kernel space. As a result, execution of a Java application 28 runs as much as fifty times slower than an application program written in native object code for the CPU 13. Thus, execution is dependent on the speed of translation of the bytecodes 51 by the JVM 26.

Like the JVM 26, the JIT 27 is also an application program running in user space. However, the JIT 27 attempts to avoid the overall performance penalty of line-by-line interpretation of the JVM 26 by pre-compiling the Java application 28 into native machine instructions prior to execution by the CPU 13. The actual execution of the Java application 28 approaches near native execution speeds. However, compilation and class library linking costs are incurred each time the Java bytecodes 51 are executed, thereby resulting in slower overall execution times.

According to an embodiment of the present invention, the system 10 (shown in FIG. 1) is modified by the following operational components 40. First, the JVM 26 and JIT 27 are replaced by or, in a further embodiment, augmented with the shim 41 for accelerating execution of the bytecodes 51 on the co-processor 34. The purpose of the shim 41 is to trap the bytecodes 51 for the Java application 28 under execution and coordinate their execution with the co-processor 34. The shim 41 does not execute the bytecodes 51 for the Java application 28. Rather, the shim 41 sets up a runtime environment for the co-processor 34 to execute the bytecodes 51 in parallel with the CPU 13.

Functionally, the shim 41 includes a class loader 9 and a memory manager 50. The class loader 49 loads and links any missing runtime libraries and Java non-core object classes. The memory manager 50 initializes the runtime environment for the Java application 28. An address space allocator 52 in the memory manager 50 sets up an address space for the bytecodes 51 for the Java application 28 and non-core class instances (not shown) in the main memory 14 (shown in FIG. 1) while a code loader 53 loads the bytecodes 51 and the non-core class instances into the address space using the operating system 24. The memory manager 50 also ensures critical bytecode segments are locked into place in the main memory 14. The operational steps performed by the shim 41 and its related system components, including the Java co-processor device driver 42 and co-processor components 43, are further described hereinbelow with reference to FIG. 4 et seq.

Second, the operating system 24 is augmented with a Java co-processor device driver 42. The purpose of the Java co-processor device driver 42 is to coordinate the processing of system service requests received from the co-processor modules 43 with the requested device in the system 10 via the system services 25 component of the operating system 24 and to interact with the shim 41.

Finally, co-processor components 43 are introduced for actually executing the bytecodes 51 on the co-processor 34. The co-processor components 43 include a microcoded JVM 46 interconnected with a Java core class library 48 and a Java applications segment 47. The microcoded JVM 46 is executed using the microcode stored in the ROM 35 (shown in FIG. 2) for specifying a firmware implementation of the functionality of a conventional JVM 26, such as described in T. Lindholm & F. Yellin, "The Java Virtual Machine Specification," cited hereinabove, the disclosure of which is incorporated herein by reference. The Java core class library 48 is stored in the Java class EEPROM 36 (shown in FIG.2) as either Java bytecodes or native object code, depending on the type of CPU 32 (shown in FIG. 2) employed as the co-processor 34. During execution of the bytecodes 51 of a Java application 28, object references to members of a core class in the Java core class library 48 are preferably dynamically linked. The dynamic linking combined with low memory access latency result in improved execution speed. The Java application segment 47 stores a segment of the bytecodes 51 for the Java application 28 presently staged in the buffer 38 (shown in FIG. 2). The step-wise operation of the operational components 40 will now be described.

III. Method for Accelerating Execution of Platform-Independent Program Code

Figure 4:
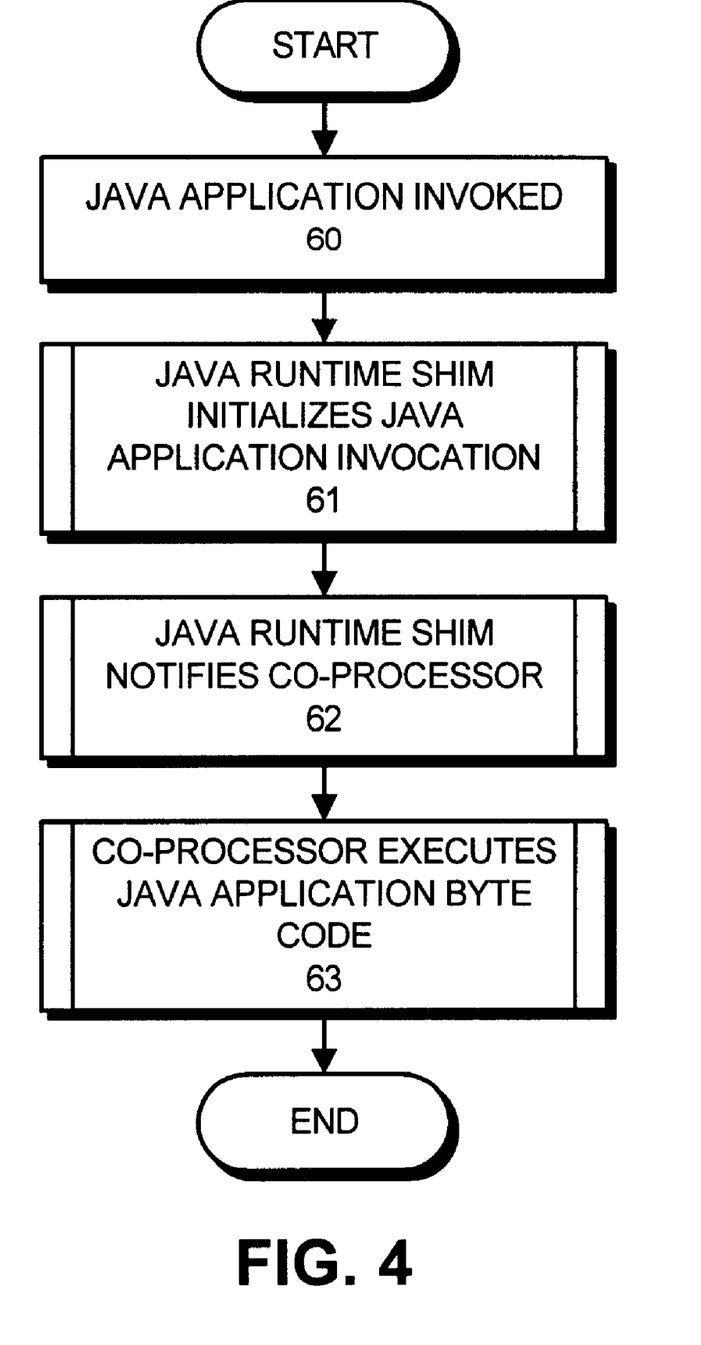
FIG. 4 is a flow diagram of a method for accelerating execution of platform-independent program code on a co-processor according to the present invention.

FIG. 4 is a flow diagram of a method for accelerating execution of platform-independent program code, such as bytecodes 51 for the Java application 28, on a co-processor 34 (shown in FIG. 2) according to the present invention. In the described embodiment, the method operates on the system 10 of FIG. 1, but also can operate on a functionally-equivalent system implementing co-processor modules 43 which execute independently of the CPU 13. Thus, for example, a co-processor 34 could be incorporated as part of the system board circuitry within the spirit of the present invention.

The method of FIG. 4 will be discussed in conjunction with an example of a Java program shown below in Example 1 in uncompiled Java source code. The purpose of the program is to print a character string "Hello World." The Java source code is compiled into bytecodes 51 prior to execution.

EXAMPLE 1.

```
public class HelloWorld {
    public static void main (String argv[]) {
        System.out.println ("Hello World");
    }
}
```

First, the Java application 28 is invoked (block 60), for example, using a command "java HelloWorld" where java invokes the execution of the bytecodes 51 for the Java application 28 and HelloWorld is the name of the Java application 28 itself. Responsive to the Java application invocation (block 60), the shim 41 initializes a runtime environment (block 61) as further described below with reference to FIG. 5. Upon runtime environment initialization completion, the shim 41 notifies the co-processor 34 of a new pending Java application 28 (block 62), as further described below with reference to FIG. 6. Notification of the Java application 28 invocation is required for coordination of concurrent execution by the co-processor 34. Finally, the co-processor 34 executes the Java application 28 (block 63) as further described below with reference to FIG. 7. The method then terminates and the co-processor 34 idles until notification of a new pending Java application 28.

Figure 5:
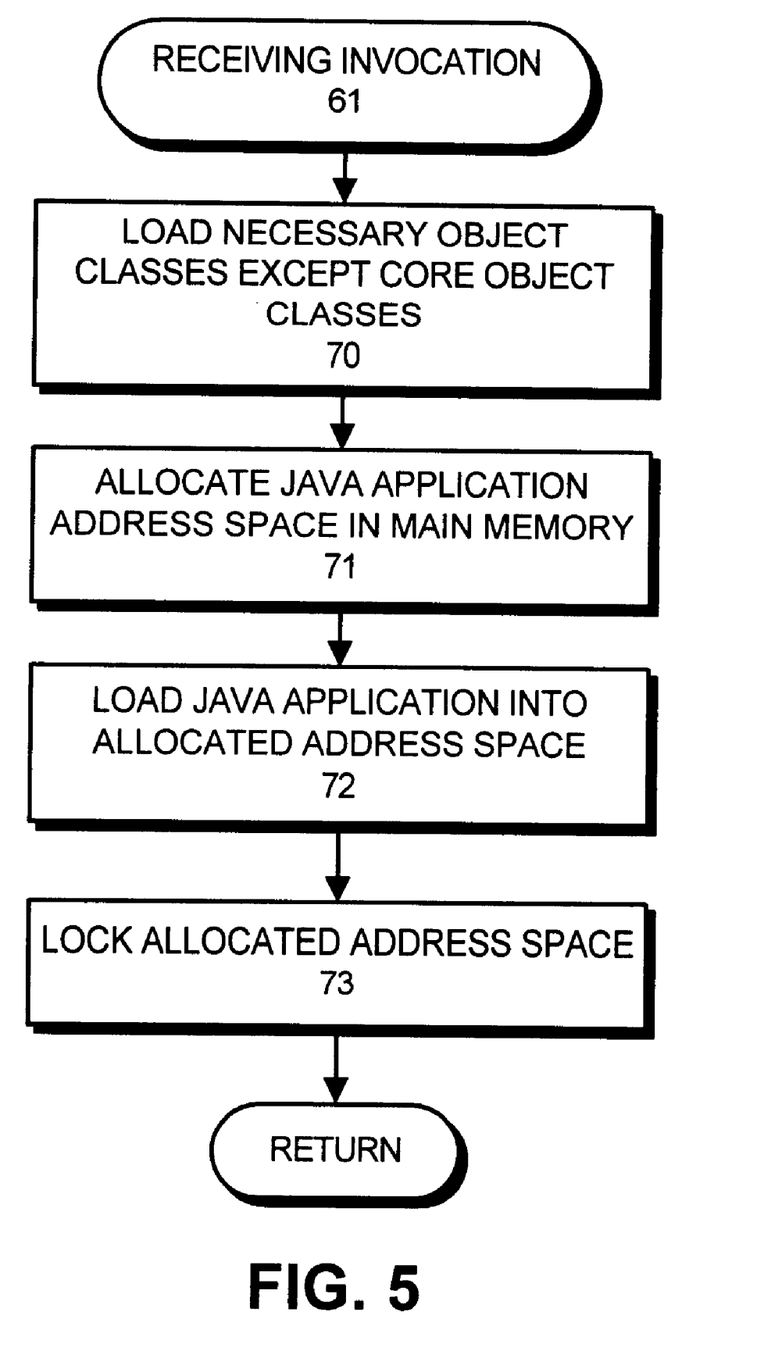
FIG. 5 is a flow diagram of a routine for initializing an application invocation for use in the method of FIG. 4.

FIG. 5 is a flow diagram of a routine for initializing an application 28 invocation (block 61) for use in the method of FIG. 4. The purpose of the routine is to prepare the runtime environment of the main memory 14 and operational components 40. First, each necessary object class is loaded into the main memory 14 (shown in FIG. 1) using the class loader 49 of the shim 41. An object class is "necessary" if it is called by the Java application 28. However, calls to core object classes are not loaded since the objects are stored in the Java core class library 48 of the co-processor modules 43 (block 70). Next, the shim 41 allocates address space in the memory 14 for storing the bytecodes 51 of the Java application 28 (block 71). The bytecodes 51 are loaded into the allocated address space in the main memory 14 (block 72). Finally, the allocated address space in the main memory 14 is locked to prevent the virtual memory manager (not shown) of the operating system 24 (shown in FIG. 1) from relocating the bytecodes 51 for the Java application 28 during execution by the co-processor 34. The routine then returns.

Figure 6:
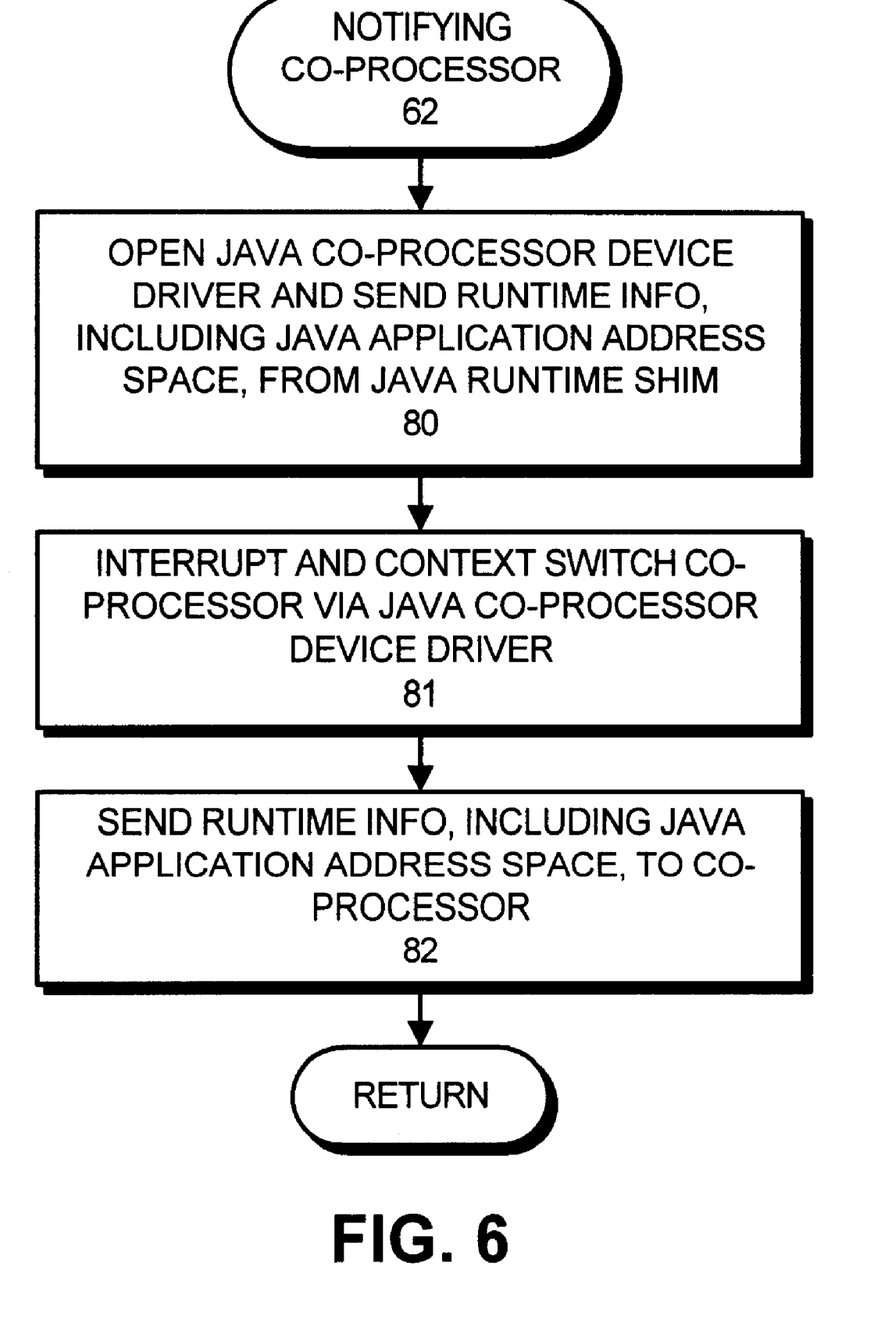
FIG. 6 is a flow diagram of a routine for notifying the co-processor of a new pending application for use in the method of FIG. 4.

FIG. 6 is a flow diagram of a routine for notifying the co-processor 34 of a new pending Java application 28 (block 62) for use in the method of FIG. 4. The purpose of the routine is to alert the co-processor 34 to a new pending process by providing the runtime environment of the Java application 28. First, the shim 41 opens the Java co-processor device driver 42 and sends the runtime information, including the Java application address space from the shim 41 (block 80). Responsive to receipt of the runtime information, the Java co-processor device driver 42 interrupts and context switches the co-processor 34 using an interrupt signal (block 81). The context switch saves the current execution context of the co-processor 34 before transitioning to another task. The location of the context can be either in the main memory 14 (shown in FIG. 1) or a dedicated region of the buffer 38 (shown in FIG. 2). At any given point while the co processor 34 is executing some section of code, an interrupt can be sent by another shim 41 requesting the execution of another Java application 28. Therefore, before the co-processor 34 switches to the new Java application 28, the co-processor 34 must save the current execution context so the interrupted application can be reinstated when its execution resumes. Ordinarily, execution resumes when the associated shim 41 process is allocated a new time slice by the operating system 24. Execution continues until either another shim 41 application requests its application be executed or a system service call (block 104 in FIG. 8) is pending. Finally, the runtime information, including the allocated address space in the main memory 14 for the bytecodes 51 for the Java application 28, is sent from the Java co-processor device driver 42 to the co-processor 34 (block 82). The routine then returns.

Figure 7:
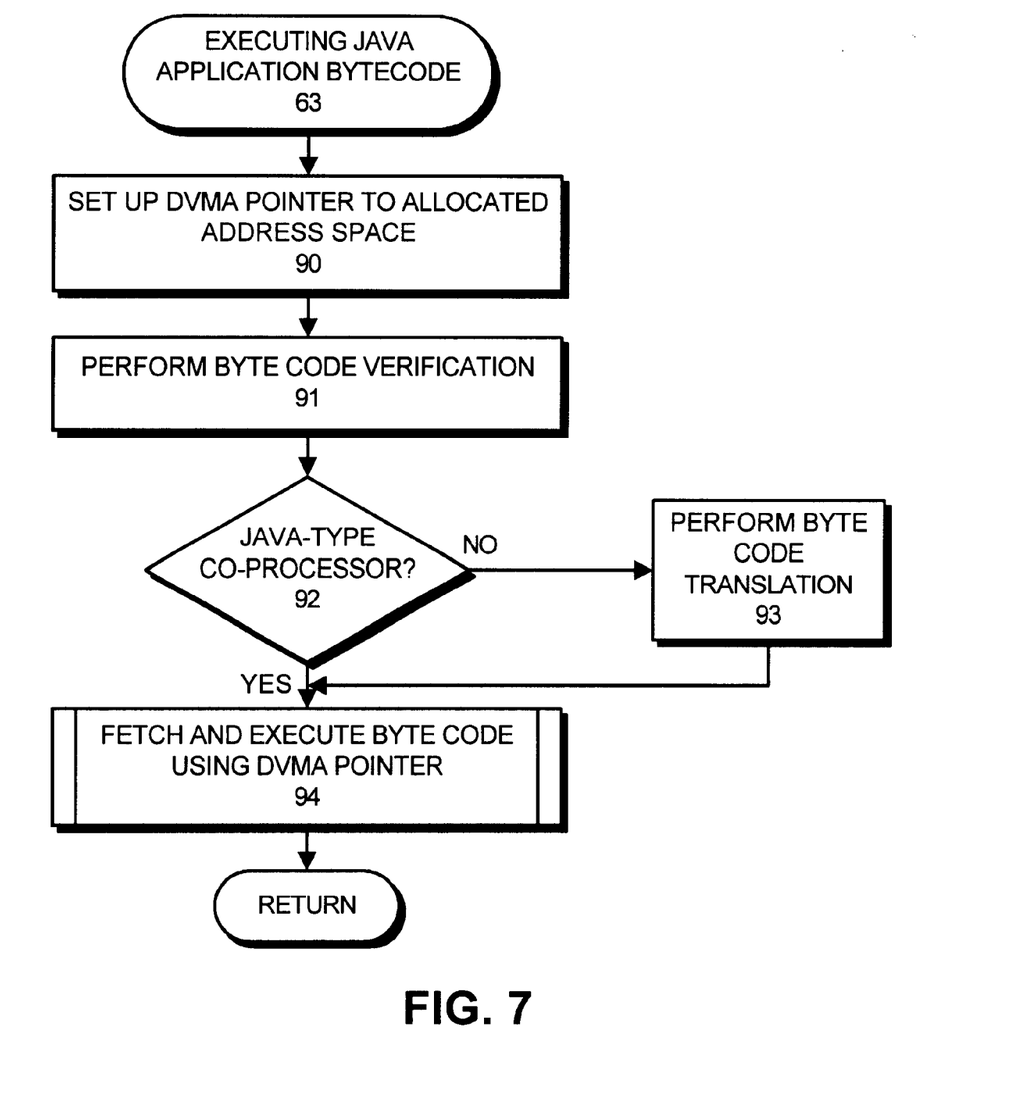
FIG. 7 is a flow diagram of a routine for executing the application on the co-processor for use in the method of FIG. 4.

FIG. 7 is a flow diagram of a routine for executing the application 28 on the co-processor 34 (block 63) for use in the method of FIG. 4. The purpose of the routine is to verify and execute the bytecodes 51. The DVMA logic 37 (shown in FIG. 2) sets up a DVMA pointer (not shown) to the allocated address space for the Java application 28 in the main memory 14 (block 90). The DVMA pointer is used by the DVMA logic 37 for loading memory pages from the main memory 14 into the buffer 38 (shown in FIG. 2) in an on-demand, per memory page basis. This paging behavior prevents long memory access latencies. The co-processor 34 performs bytecode verification of the bytecodes 51 prior to the beginning of execution for ensuring the security integrity of the bytecodes 51 (block 91). If the CPU 32 (shown in FIG. 2) used by the co-processor 34 is not a Java-type co-processor (block 92), the bytecodes 51 are translated into the native instruction set for the CPU 32 (block 93) using the translation logic 33 (shown in FIG. 3). Otherwise, if the CPU 32 is a Java-type co-processor (block 92), no translation is required. Finally, the bytecodes 51 are fetched and executed from the allocated address space in the main memory 14 using the DVMA pointer of the DVMA logic 37 (block 94), as further described below with reference to FIG. 8. The routine then returns.

Figure 8:
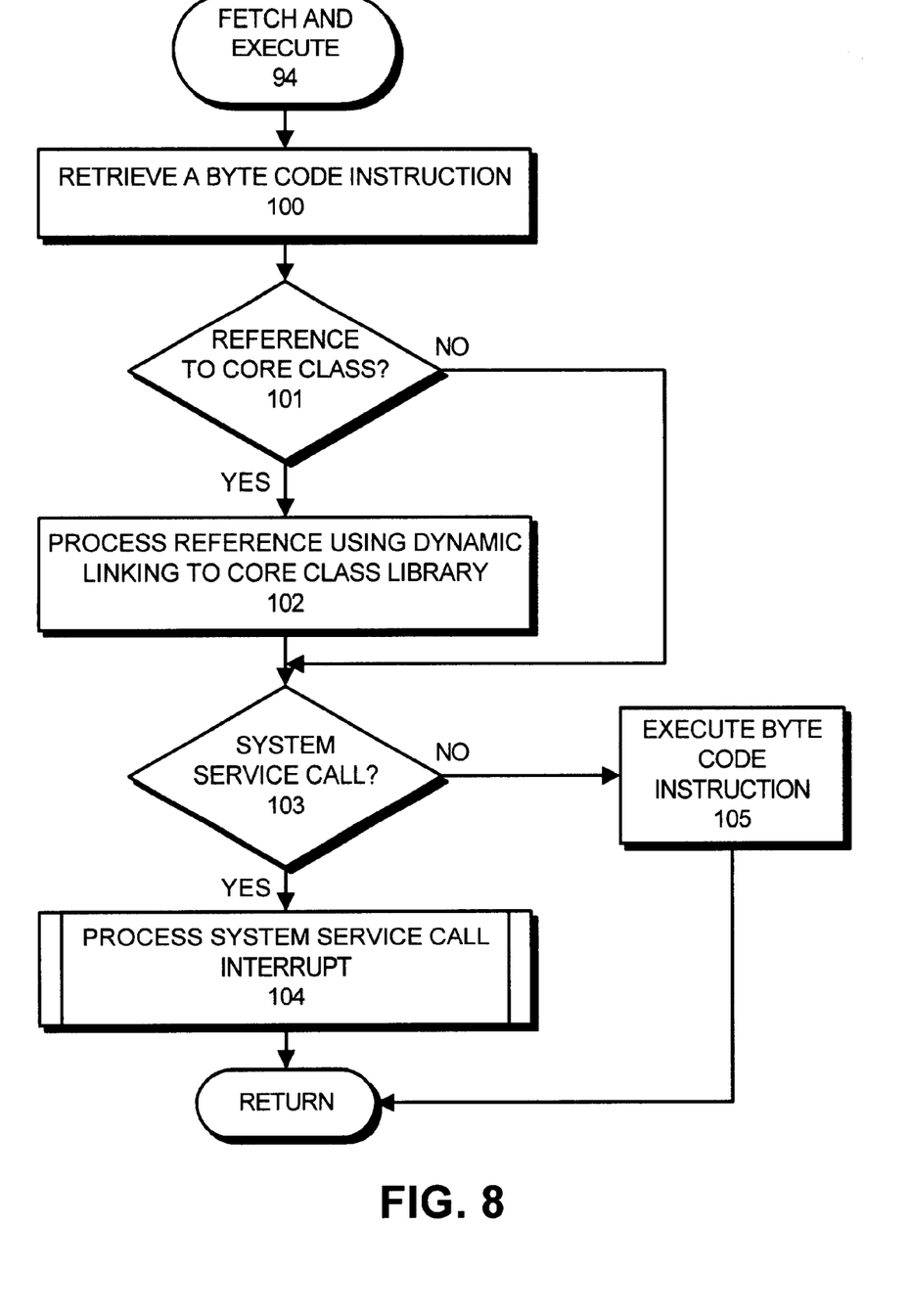
FIG. 8 is a flow diagram of a routine for fetching and executing a bytecode instruction on the co-processor for use in the routine of FIG. 7.

FIG. 8 is a flow diagram of a routine 94 for fetching and executing an individual bytecode instruction 51 on the co-processor 34 (block 94) for use in the routine of FIG. 7. The purpose of the routine is to repeatedly fetch and execute each bytecode instruction as follows. First, a bytecode instruction is retrieved from the allocated address space for the Java application 28 in the main memory 14 (as mapped by the DVMA logic 37 into the buffer 38) (block 100). If the bytecode instruction includes a reference to a core class object (block 101), the referenced object is retrieved by referencing the Java core class library 48 (shown in FIG. 3) stored on the Java class EEPROM 36 (shown in FIG. 2) (block 102). Similarly, if the bytecode instruction is a system service call (block 103), a system service call interrupt is generated by the co-processor 34 for processing the service call (block 104), as further described below with reference to FIG. 9. Otherwise, if the bytecode instruction is not a system service call (block 103), the bytecode instruction is executed by the co-processor 34 (block 105). The routine then returns.

Figure 9:
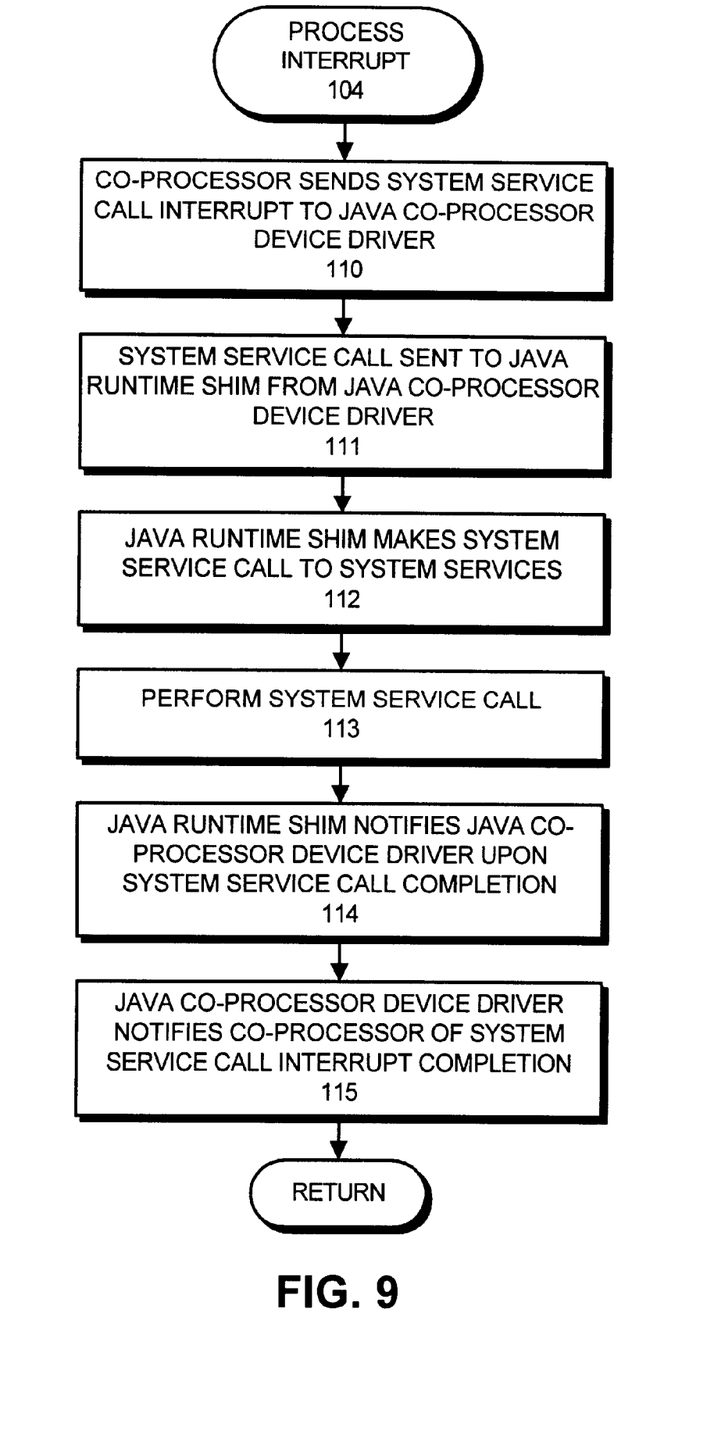
FIG. 9 is a flow diagram of a routine for processing an interrupt for use in the routine of FIG. 8.

FIG. 9 is a flow diagram of a routine for processing an interrupt (block 104) for use in the routine of FIG. 8. The purpose of the routine is to interface the co-processor 34 with the operating system 24 and the hardware components of the system 10 for system services not provided by the co-processor 34 itself. First, the co-processor 34 sends the system service call interrupt to the Java co-processor device driver 42 (shown in FIG. 3) (block 110). Responsive to receipt of the system service call interrupt, the Java co-processor device driver 42 forwards the system service call to the shim 41 (shown in FIG. 3) (block 111). In turn, the shim 41 makes a system service call request to the system services 25 (shown in FIG. 3) (block 112). The operating system 24 next performs the system service call (block 113) and upon completion of the system service call, the shim 41 notifies the Java co-processor device driver 42 of the completion (block 114). Finally, the Java co-processor device driver 42 notifies the co-processor 34 of the system service call interrupt completion (block 115). The routine then returns.

The present invention provides a system and method for substantially accelerating the execution of platform-independent program code, such as Java bytecode instructions, using a co-processor. Instruction execution acceleration is achieved in part through the use of several novel features These features include the staging of the Java core class library 48 in the Java core class EEPROM 36. Accesses off the daughter board 29 to load core class objects are thereby avoided. Third, execution of the bytecodes 51 using the co-processor 34 is performed concurrently to the CPU 13 which is then able to perform other tasks. Finally, bytecode verification of the Java application 28 is performed in hardware using the co-processor 34. The bytecode verification steps are stored in the ROM 35 and thereby made more secure. The net result is faster bytecode verification.

While the invention has been particularly shown and described with reference to embodiments thereof, those skilled in the art will understand that the foregoing and other changes in form and detail may be made therein without departing from the spirit and scope of the present invention.

What is claimed is:

1. A system for executing platform-independent code on a co-processor, the system comprising a processor, a main memory and the co-processor, each interconnected with each other, the processor and the co-processor operating under control of an operating system, the system comprising:

a memory manager operatively coupled to the operating system for initializing a runtime environment comprising an address space in the main memory for the platform-independent code;

a runtime shim operatively coupled to the operating system for providing the initialized runtime environment to the co-processor through the operating system;

the co-processor for executing the platform-independent code responsive to the runtime shim with reference to the address space in the main memory; and a programmable read only memory operatively coupled to the co-processor for storing core classes of the platform-independent code.

2. A system according to claim 1, the memory manager further comprising:

an address space allocator for allocating the address space in the main memory for the platform-independent code; and a code loader for loading, responsive to the memory manager, the platform-independent code into the allocated address space in the main memory using the operating system.

3. A system according to claim 2, wherein the platform-independent code comprises at least one reference to an object class external to the platform-independent code, the address space allocation unit allocating additional address space in the main memory for the object class for each such at least one reference, and the code loader loading the object class for each such at least one reference into the additional allocated address space in the main memory.

4. A system according to claim 2, wherein the platform-independent code is locked into the main memory by the memory manager.

5. A system according to claim 1, wherein an interrupt signal is sent to the co-processor from the runtime shim via the operating system and a location in the main memory for the address space is sent to the co-processor from the runtime shim.

6. A system according to claim 5, further comprising a device driver functionally interposed within the operating system between the runtime shim and the co-processor for interfacing between the runtime shim and the co-processor.

7. A system according to claim 1, wherein the system further comprises a buffer operatively interposed between the main memory and the co-processor, the main memory further comprising a plurality of memory pages, wherein the co-processor receives a pointer pointing to a starting location in the main memory for the address space for the platform-independent code, the starting location being associated with a first such memory page in the main memory, retrieves using the pointer the first such memory page from the main memory into the buffer, retrieves using the pointer another such memory page for each such instruction in the platform-independent code occurring on a different such memory page than retrieved into the buffer, and executes the retrieved instruction on the co-processor.

8. A system according to claim 7, wherein the co-processor operates directly responsive to the platform-independent code, the co-processor directly executing the retrieved instruction.

9. A system according to claim 7, wherein the co-processor operates responsive to a non-native instruction set different from the platform-independent code, the co-processor further comprising translation logic for translating the retrieved instruction into an equivalent instruction in the non-native instruction set using the translation logic, the co-processor executing the equivalent instruction.

10. A system according to claim 7, wherein the co-processor verifies the security integrity of the platform-independent code.

11. A system according to claim 7, wherein the platform-independent code comprises at least one reference to a core object class external to the platform-independent code, the co-processor further comprising a core object class library storing a plurality of core object classes, the co-processor retrieving the core object class for each such reference from the core object class library and dynamically linking the retrieved core object class to the platform-independent code.

12. A system according to claim 7, wherein the platform-independent code comprises at least one reference to a system service call external to the platform-independent code, the processor processing the system call by cooperatively interfacing to the runtime shim.

13. A method using a computer for executing platform-independent code on a co-processor, the computer comprising a processor, a main memory, a programmable read only memory, and the co-processor, each interconnected with each other, the processor and the co-processor operating under control of an operating system, the method comprising the steps of:

initializing a runtime environment comprising an address space in the main memory for the platform-independent code using a memory manager operatively coupled to the operating system;

providing the initialized runtime environment to the co-processor through the operating system using a runtime shim operatively coupled to the operating system; and executing the platform-independent code on the co-processor responsive to the runtime shim with reference to the address space in the main memory;

wherein the co-processor executes the core classes of the platform-independent code from the programmable read only memory.

14. A method according to claim 13, the step of initializing the runtime environment further comprising the steps of:

allocating the address space in the main memory for the platform-independent code using the runtime shim; and loading, responsive to the runtime shim, the platform-independent code into the allocated address space in the main memory using the operating system.

15. A method according to claim 14, wherein the platform-independent code comprises at least one reference to an object class external to the platform-independent code, the step of allocating the address space further comprising allocating additional address space in the main memory of the object class for each such at least one reference, the step of loading further comprising loading the object class for each such at least one reference into the additional allocated address space in the main memory.

16. A method according to claim 14, further comprising the step of locking the platform-independent code into the main memory.

17. A method according to claim 13, the step of providing initialized runtime environment further comprising the steps of:

sending an interrupt signal to the co-processor from the runtime shim via the operating system; and sending a location in the main memory for the address space to the co-procssor from the runtime shim.

18. A method according to claim 17, further comprising the step of interfacing between the runtime shim and the co-processor via a device driver functionally interposed within the operating system between the runtime shim and the co-processor.

19. A method according to claim 13, wherein the system further comprises a buffer operatively interposed between the main memory and the co-processor, the main memory further comprising a plurality of memory pages, the step of executing the platform-independent code further comprising the steps of:

receiving a pointer into the co-processor pointing to a starting location in the main memory for the address space for the platform-independent code, the starting location being associated with a first such memory page in the main memory;

retrieving using the pointer the first such memory page from the main memory into the buffer;

retrieving using the pointer another such memory page for each such instruction in the platform-independent code occurring on a different such memory page than retrieved into the buffer; and executing the retrieved instruction on the co-processor.

20. A method according to claim 19, wherein the co processor operates directly responsive to the platform-independent code, the step of executing the retrieved instruction further comprising the step of directly executing the retrieved instruction on the co-processor.

21. A method according to claim 19, wherein the co-processor operates responsive to a non-native instruction set different from the platform-independent code, the co-processor further comprising translation logic, the step of executing the retrieved instruction further comprising the steps of:

translating the retrieved instruction into an equivalent instruction in the non-native instruction set using the translation logic; and executing the equivalent instruction on the co-processor.

22. A method according to claim 19, further comprising the step of verifying the security integrity of the platform-independent code using the co-processor.

23. A method according to claim 19, wherein the platform-independent code comprises at least one reference to a core object class external to the platform-independent code and the co-processor further comprises a core object class library storing a plurality of core object classes, the step of retrieving further comprising the steps of:

retrieving the core object class for each such reference from the core object class library; and dynamically linking the retrieved core object class to the platform-independent code.

24. A method according to claim 19, wherein the platform-independent code comprises at least one reference to a system service call external to the platform-independent code, the step of retrieving further comprising the step of processing the system service call on the processor cooperatively interfacing to the runtime shim.

25. A method according to claim 24, the step of processing the system service call further comprising the steps of:

sending a system service call interrupt from the co-processor to the runtime shim;

receiving the system service call interrupt in the runtime shim and, in response, sending a system service call to the operating system;

performing the system service on the processor;

notifying the runtime shim upon completion of the system service using the processor; and notifying the co-processor upon completion of the system service call using the runtime shim.

26. An apparatus for efficiently executing platform-independent code in a computer system, the computer system including a processor and a main memory, each interconnected with each other, the apparatus comprising:

interfacing logic interconnecting the apparatus with the processor and the main memory and comprising channels for exchanging control, data and address signals with the processor and the main memory;

a co-processor executing the platform-independent code in coordination with but independently from the processor;

a buffer interconnected with the co-processor and comprising a plurality of storage locations in which are staged segments of the platform-independent code prior to execution by the co-processor;

a programmable read only memory for storing core classes of the platform-independent code;

a direct memory access (DMA) controller interconnected with the buffer and interfacing directly to the main memory through the interfacing logic, the DMA controller staging the segments of the platform-independent code into the buffer from the main memory; and a bus internal to the apparatus interconnecting the interfacing logic, the co-processor, the direct memory access controller, and the programmable read only memory, the interfacing logic providing the control, data and address signals over the internal bus.

27. An apparatus according to claim 26, further comprising a programmable read only memory (PROM) comprising a plurality of storage locations in which are stored executable core program segments, the co-processor retrieving the executable core program segments in response to a core program call in the platform-independent code, the internal bus interconnecting the co-processor with the PROM.

28. An apparatus according to claim 26, further comprising a read only memory (ROM) comprising a plurality of storage locations in which are stored microcode instructions, the co-processor executing the platform-independent code in accordance with the microcode instructions, the internal bus interconnecting the co-processor with the ROM.

29. An apparatus according to claim 26, wherein the co-processor further comprises a processor configured to operate under control of an instruction set for the platform-independent code.

30. An apparatus according to claim 26, wherein the co-processor further comprises:

a processor configured to operate under control of an instruction set for the platform-specific code; and translation logic converting the instruction set for the platform-specific code to an instruction set for the platform-independent code.

31. A method using a computer for facilitating execution of platform-independent program code on a co-processor, the computer including a processor, a main memory, a programmable read only memory, and the co-processor, each interconnected with each other, the method comprising the steps of:

initializing a runtime environment comprising an address space in the main memory in which is stored the platform-independent program code;

notifying the co-processor to begin execution of the platform-independent program code including providing the address space in the runtime environment to the co-processor; and coordinating execution of the platform-independent program code by the co-processor with independent execution of other program code by the processor and managing the main memory between the address space in the runtime environment and the main memory used by the processor;

wherein the co-processor executes the core classes of the platform-independent code from the programmable read only memory.

32. A method according to claim 31, further comprising the step of processing system service call interrupts received from the co-processor.

* * * * *